United States Patent [19]

Murphy et al.

[11] Patent Number: 5,745,169
[45] Date of Patent: Apr. 28, 1998

[54] DETECTING ERRORS IN VIDEO IMAGES

[75] Inventors: Angela Ruth Murphy; Stephen Richard Gunby, both of Essex, United Kingdom

[73] Assignee: British Telecommunications public limited company, London, England

[21] Appl. No.: 586,647
[22] PCT Filed: Jul. 19, 1994
[86] PCT No.: PCT/GB94/01558
  § 371 Date: Jan. 18, 1996
  § 102(e) Date: Jan. 18, 1996
[87] PCT Pub. No.: WO95/03674
  PCT Pub. Date: Feb. 2, 1995

Related U.S. Application Data

[63] Continuation-in-part of Ser. No. 126,582, Sep. 27, 1993, abandoned.

[30] Foreign Application Priority Data

Jul. 19, 1993 [EP] European Pat. Off. ............ 93305646

[51] Int. Cl.$^6$ .................................................. H04N 7/133
[52] U.S. Cl. .............. 348/192; 348/402; 348/403; 348/407; 348/420; 348/616
[58] Field of Search ........................ 371/31; 348/403, 348/407, 421, 616, 404, 406, 408, 401, 402, 420, 192; H04N 7/133

[56] References Cited

U.S. PATENT DOCUMENTS

| | | | |
|---|---|---|---|
| 4,442,454 | 4/1984 | Powell | 348/408 |
| 4,555,729 | 11/1985 | Driessen | 348/403 |
| 4,807,033 | 2/1989 | Keesen et al. | 348/616 |
| 4,897,724 | 1/1990 | Veldhuis | 348/616 |
| 5,079,631 | 1/1992 | Lhuillier et al. | 348/408 |
| 5,150,210 | 9/1992 | Hoshi et al. | 348/416 |
| 5,228,028 | 7/1993 | Cucchi et al. | 371/31 |
| 5,243,428 | 9/1993 | Challapali et al. | 371/31 |

OTHER PUBLICATIONS

Jeng et al, "Concealment of Bit Error and Cell Loss in Inter–Frame Coded Video Transmission", Internatiional Conference on Communication 91, vol. 1, 23 Jun. 1991, Denver, CO., pp. 496–500.

Patent Abstract of Japan, vol. 16, No.288 (E–1223) Jun. 25, 1992 & JP–A–04 072 985 (Toshiba Corporation.) 6 Mar. 1992.

Patent Abstracts of Japan, vol. 15, No. 261 (E–1085) 3 Jul. 1991 & JP–A–03 085 820 (Matsushita Electric Industrial Co., Ktd.) 11 Apr. 1991.

(List continued on next page.)

*Primary Examiner*—John K. Peng
*Assistant Examiner*—Jeffrey S. Murrell
*Attorney, Agent, or Firm*—Nixon & Vanderhye P.C.

[57] ABSTRACT

An error is identified in a video image by calculating frequency-related coefficients for blocks of the image and considering the statistical distribution of said coefficients. The variance of the coefficients is calculated and a block of original image data is concealed if the variance calculated is significantly higher than a stored threshold and/or if said variance calculated is significantly different from variance values derived for similarly positioned blocks within a previous frame. Concealment is effected by selecting image data from a previous frame, displaced in response to transmitted motion vectors.

13 Claims, 7 Drawing Sheets

OTHER PUBLICATIONS

"An Error Concealment Method Agains Transmission Error in DCT Coding", Saito et al, Picture Coding Symposium, Sep. 1991, Tokyo, Japan, pp. 185–188.

"Selective Recovery of Video Packet Loss Using Error Concealment", Wada, IEEE Journal On Selected Areas in Communications, vol. 7, No. 5, Jun. 1989, pp. 807–814.

"Partial Correction of transmission Errors in Walsh Transform Image Without Recourse to Error Correction Coding", Wong et al, Electronics Letters, Apr. 1978, three pages.

"Predictable Sample Error Detector and a Planar Prediction Corrector for Removal of Isolated Transmission Errors in Walsh–Hadamard Transformed Pictures", Fenwich et al, Electronics Letters, Jul. 1977, 3 pages.

"Channel Error Recovery for Transform image Coding", Mitchell et al, IEEE Transaction On Communications, vol. Comm–29, No. 12, Dec. 1981, pp. 1754–1762.

"Video Compression Makes Big Gains", Ang et al, IEEE Spectrum, Oct. 1991, pp. 16–19.

"Partial Correction of Transmission Errors in D.P.C.M. Without Recourse to Error Correction Coding", Steele et al, Electronics Letters, Jun. 1977, pp. 351–353.

"Enhancement of PCM and DPCM Images Corrupted by Transmission Errors", Nigan et al, IEEE Transactions On Communications, vol.–Com–30, No. 1, Jan. 1982, pp. 257–264.

DETECTING ERRORS IN VIDEO IMAGES

CROSS-REFERENCE TO RELATED APPLICATION

This application and its parent PCT/GB94/01558 (designating the United States) filed 19 Jul. 1994 are continuations-in-part of our copending commonly assigned application Ser. No. 08/126,582 filed Sep. 27, 1993, now abandoned.

BACKGROUND OF THE INVENTION

1. Field of the Invention

The present invention relates to detecting errors in signals representing video images.

2. Related Art

In addition to the broadcasting and storage of full bandwidth video signals, interest has also developed in techniques for reducing the bandwidth requirement for the transmission or storage of a video signal. These techniques facilitate, amongst other things, two-way transmission of video signals, leading to the development of affordable video conferencing facilities and video telephones.

A problem with compressing video data for transmission over limited bandwidth transmission paths, is that the data becomes more susceptible to the presence of transmission errors. The nature of the transmission path will be such that errors usually cannot be prevented and in order to improve the overall result of transmitted images, it would be preferable to identify the presence of errors, and their locations within the video image and, where possible, take action to conceal these errors.

One method for detecting errors comprises including an error correction code as an overhead. Cyclic redundancy codes are widely used for error detection at the expense of a small overhead in the transmitted signal.

If the error correction code is corrupted during transmission, this is detected at a receiver and the corrupted data replaced, for instance as described in U.S. Pat. No. 5,150,210.

SUMMARY OF THE INVENTION

The present invention seeks to provide an improved method and apparatus for detecting the presence of errors in a video signal.

According to a first aspect of the present invention, there is provided a method of detecting an error in a signal representing a video image, comprising:

receiving blocks of frequency related coefficients representing respective blocks in the video image; and analysing the statistical distribution of said coefficients within a block to detect the presence of corrupted data.

In a preferred embodiment, said analysing step involves calculating the variance of said coefficients in a block. Variance is determined by calculating the difference between actual coefficient values and the mean value, forming the square of said difference and summing said squares, i.e.

$$\sigma = \sum_{i=1}^{N} (x_i - \bar{x})^2$$

where $\sigma$ = variance
$x_i$ = value of the ith coefficient
$\bar{x}$ = mean value of all the coefficents within a block N = number of coefficients in a block The variance may be compared against a predetermined threshold and an error identified if the variance is greater than said threshold. Alternatively or additionally, the variance values for the blocks of a frame may be stored and the variance for a block under consideration may be compared with the variance of the block in a previous frame that is similarly positioned and/or for the surrounding blocks of the previous frame. A mean variance value may be calculated for the blocks of the previous frame and an error detected if the variance value under consideration is significantly larger or significantly smaller than the mean value for the previous frame.

If the transmission coding scheme employs frequency related coefficients which represent the actual values of the pixels within a block, for example the video signal is intraframe coded using DCT coefficients only, the mathematical distribution of the transmitted coefficients may be directly analysed. However the coding scheme employed might not result in frequency related coefficients representing the actual value of the pixels. For instance, if the transmitted signal represents the difference between the current frame and an earlier frame, the actual pixel values, and hence the mathematical distribution of the resulting frequency coefficients, cannot be obtained without first decompressing the received signal to produce the actual pixel values, and then dividing the signal into blocks and transforming the signal into the frequency domain to produce the frequency related coefficients.

In a preferred embodiment, action is taken to conceal a block if an error is identified. This may involve the substitution of the detected block by a similarly positioned block in a previous frame or its motion compensated block. Alternatively, a new motion vector may be calculated by averaging motion vectors for the similarly positioned block and surrounding blocks from a previous frame to produce a motion vector relating to a block in the previous frame with which the current block is to be replaced.

BRIEF DESCRIPTION OF THE DRAWINGS

The invention will now be described by way of example only, with reference to the accompanying drawings, of which.

DETAILED DESCRIPTION OF EXEMPLARY EMBODIMENTS

Figure 1:
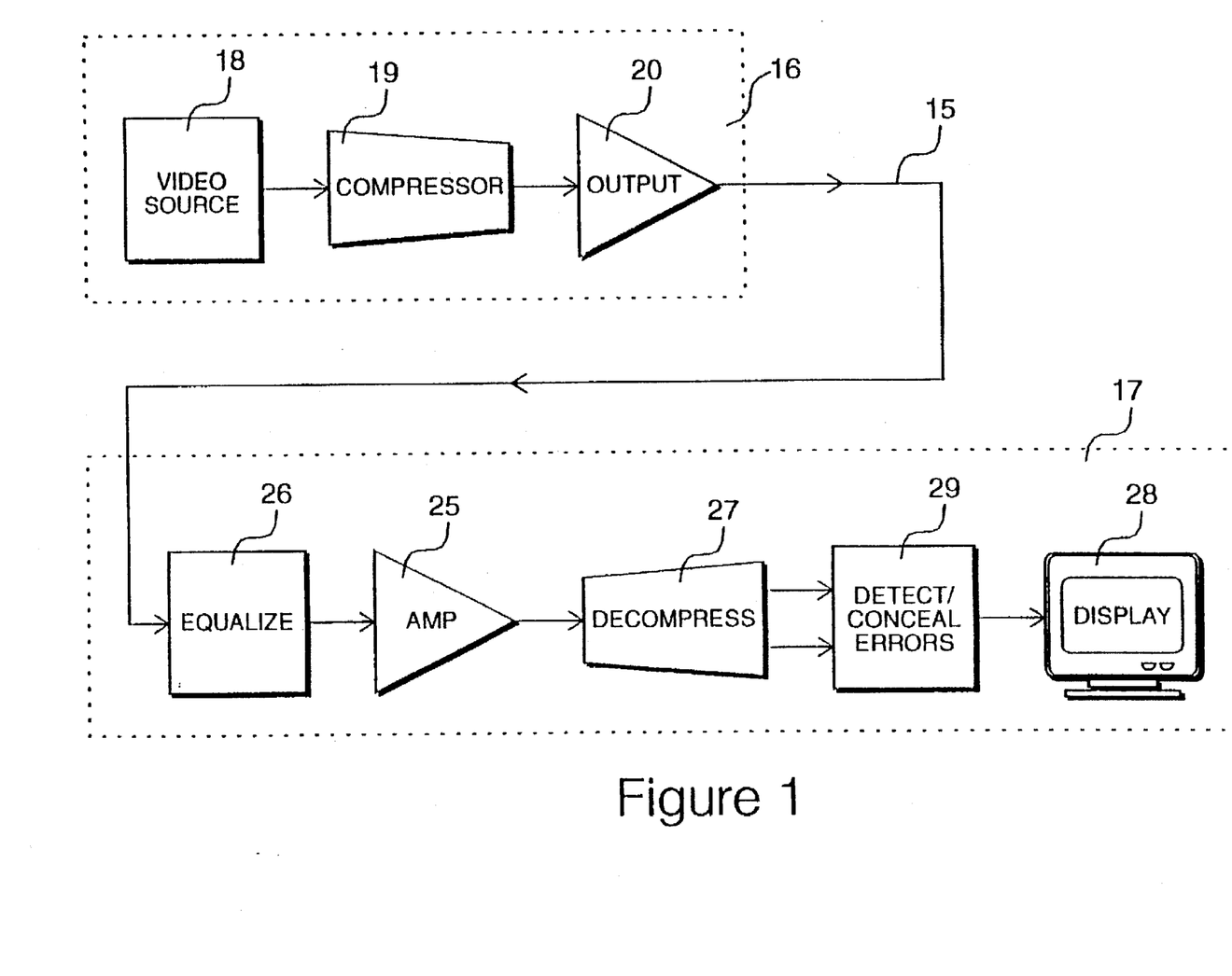
FIG. 1 shows a system for transmitting and receiving compressed video data, including a circuit for detecting and concealing errors.

A system for transmitting compressed video data over a transmission path 15 from a transmitting station 16 to a receiving station 17 is shown in FIG. 1. A conventional video signal is generated by a video source 18, which may be a video camera, a video tape player or similar equipment. The transmission path 15 has a limited bandwidth, therefore video data is compressed so as to be retained within the available bandwidth. The transmission path may be a telephone line, a dedicated digital link, a radio link or any other known means of providing a communication channel. By convention, the compressed video signal is in non-interlaced form, with each video frame having 288 lines with 352 picture elements on each line. In non-compressed form, each picture element has a luminance value represented by eight bits of data, with a smaller number of bits allocated to represent each colour difference signal.

The video data generated by the video source 18 is compressed by a compression circuit 19 which may, for example, compress the video data in accordance with the CCITT H.261 compression recommendation although the invention is not limited to this form of compression. According to the H.261 recommendation, the video signal to be compressed is divided into portions representing blocks of pixels of the video image. Each block is transformed into the frequency domain by a discrete cosine transform (DCT) and the coefficients are transmitted. The blocks may be compressed without reference to any other block or frame (intra frame coding) or with reference to another block or frame, in which case the DCT coefficients represent the differences between the compared blocks. The original video data includes eight bits luminance for each picture element location and the block consists of an 8×8 array of picture elements. An array of coefficients is similarly proportioned but the resolution is such that a minimum of twelve bits may be required for a particular coefficient, plus a sign bit. Compression is achieved because many of the coefficients will have values of zero and may, therefore, effectively be ignored. An output circuit 20 amplifies and, where required, modulates the compressed video signal, thereby placing it in a form suitable for transmission over the transmission path 15.

It is likely that the level of attenuation suffered by the transmitted signal will be frequency dependent, therefore an equalisation circuit 26 at the receiving station provides compensation. The received signal is then de-modulated (if required) by means not shown and amplified by an amplifying circuit 25.

De-compression is performed by a de-compression circuit 27, arranged to perform the reverse process to the compression provided by the compression circuit 19. Any errors introduced into the signal, due to noise on the transmission channel 15, may result in corruption of the data. This would result in the corrupted data being visible on a display device 28. Thus, the overall integrity of the displayed image would be improved if the corrupted data could be detected and concealed in some way.

To provide such a detection and concealing process, the system includes an error detecting and concealing circuit 29, arranged to identify a block of corrupted data and to conceal this block of corrupted data by selecting an equivalent block from a previously transmitted frame.

Figure 2:
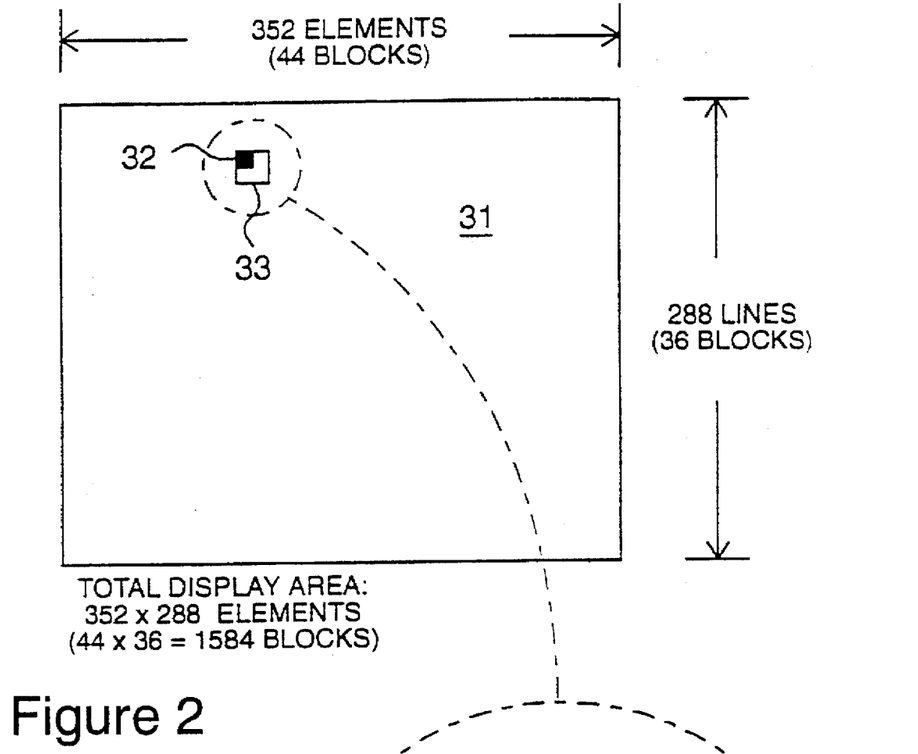
FIG. 2 and 2a show how an image is made up from a plurality of blocks.

A conventional video frame 31, as shown in FIG. 2, consists of 288 lines with 352 elements on each line. As part of the H.261 compression procedure, the frame is divided into 1584 blocks, with sixty four picture elements, in the form of an 8×8 matrix, within each block.

Figure 2A:
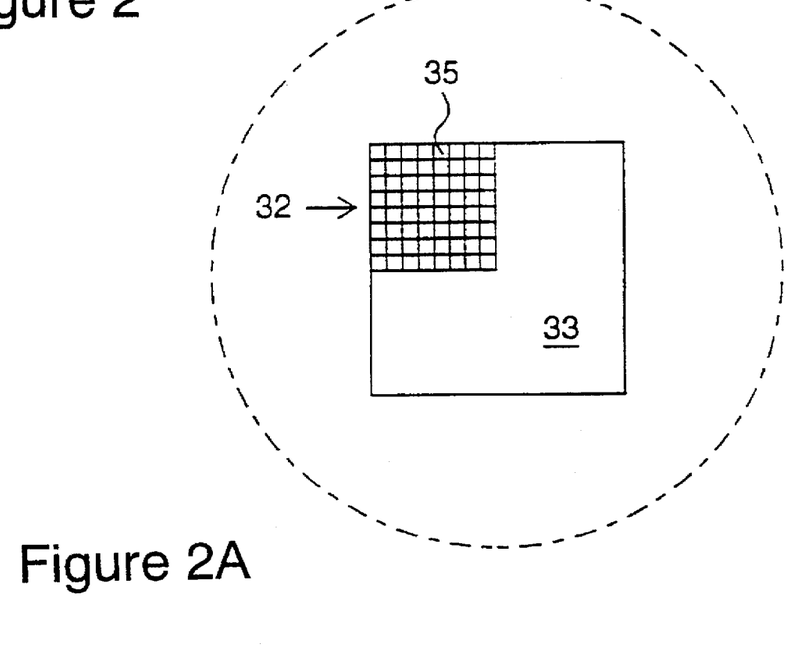

A luminance block 32 is shown in FIG. 2 and this, in combination with its three adjacent blocks, provides a macro block 32. The macro block 33 is shown enlarged at FIG. 2a, with block 32 displaying a full matrix of picture elements 35. In addition, a full colour picture also requires the transmission of two colour difference blocks per luminance block.

Figure 3:
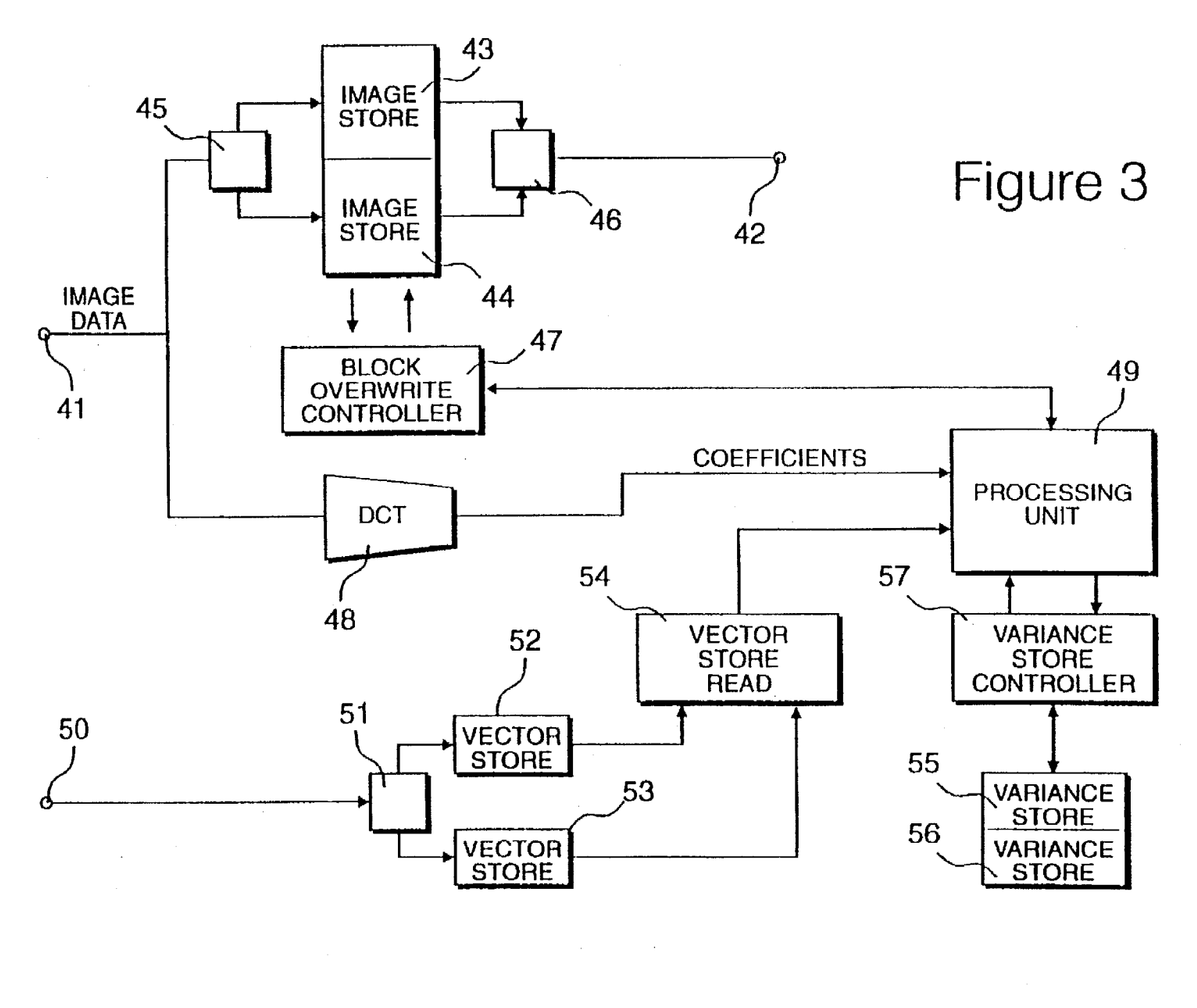
FIG. 3 shows a first embodiment of a circuit for detecting and concealing errors for use in a system as shown in FIG. 1, including a processing unit.

The error detecting and concealing circuit 29 is detailed in FIG. 3, in which decompressed video data from the decompression circuit 27 is received at an input port 41 and processed video data for display on the display device 28 is applied to an output port 42. The circuit 29 includes a first image store 43 and a second image store 44, each capable of storing a full video frame. A video write controller 45 controls the writing of video data to the image stores, such that, a first frame is written to image store 43 and a second frame is written to store 44, while the first frame is being read from the first image store 43 under the control of a video read controller 46. After a full video frame has been written to the second image store 44, the next video frame is written to the first image store 43, overwriting the previously written frame and an output signal for port 42 is derived by reading the image from store 44.

While data is being written to one of the image stores 43 or 44, said data is also processed to detect the presence of errors. When an error is detected, blocks of data in the image stores 43 and 44 may be overwritten, under the control of a block overwrite controller 47. In order to identify the presence of errors, the input image data from port 41 is also supplied to a transform unit 48, arranged to transform the input image data into frequency related coefficients for each block of picture elements. In the preferred embodiment, the transform unit performs a discrete cosine transform (DCT) on the blocks of image data. The frequency related coefficients are then supplied to a processing unit 49.

In order to detect the presence of errors in the transmitted video data, the processing unit 49 is arranged to calculate the mean and variance of the coefficient values within each block. As these variance values are calculated, they are supplied to a first variance store 55 or to a second variance store 56, thereby ensuring that variance values calculated for the previous frame are available to the processing unit 49. The writing and reading of variance values to and from stores 55 and 56 is controlled by a variance store controller 57.

If the video information supplied over the transmission path 15 is compressed in a form such that, in addition to including spatially compressed coefficients, data representing motion vectors for each block of compressed data are also supplied, the motion vectors are also supplied to the error concealing circuit 29 via an input port 50.

Motion vectors are calculated by comparing a block of picture elements in a current frame with a similarly positioned block in a previous frame and with blocks, shifted by a plurality of picture element displacements in both the x and y directions. The motion vector is not related directly to movement of objects within the original image but actually represents the closest fit, derived by comparing the block of interest with similar blocks of the previous frame. A technique for performing such comparisons in order to produce motion vectors, is disclosed in U.S. Pat. No. 5,803,202, assigned to the present applicant.

Thus, for each block of video data, x and y values are transmitted indicating a motion vector of the closest fitting block from the previous frame. These displacement vectors are supplied to a vector-store write-controller 51, wherein vectors derived from a first frame are written to a first vector store 52, vectors from the next frame are written to a second vector store 53, whereafter the first store is over-written etc.

Thus, vector values for the previous frame are available to the processing unit 49, via a vector store reading circuit 54.

Figure 4:
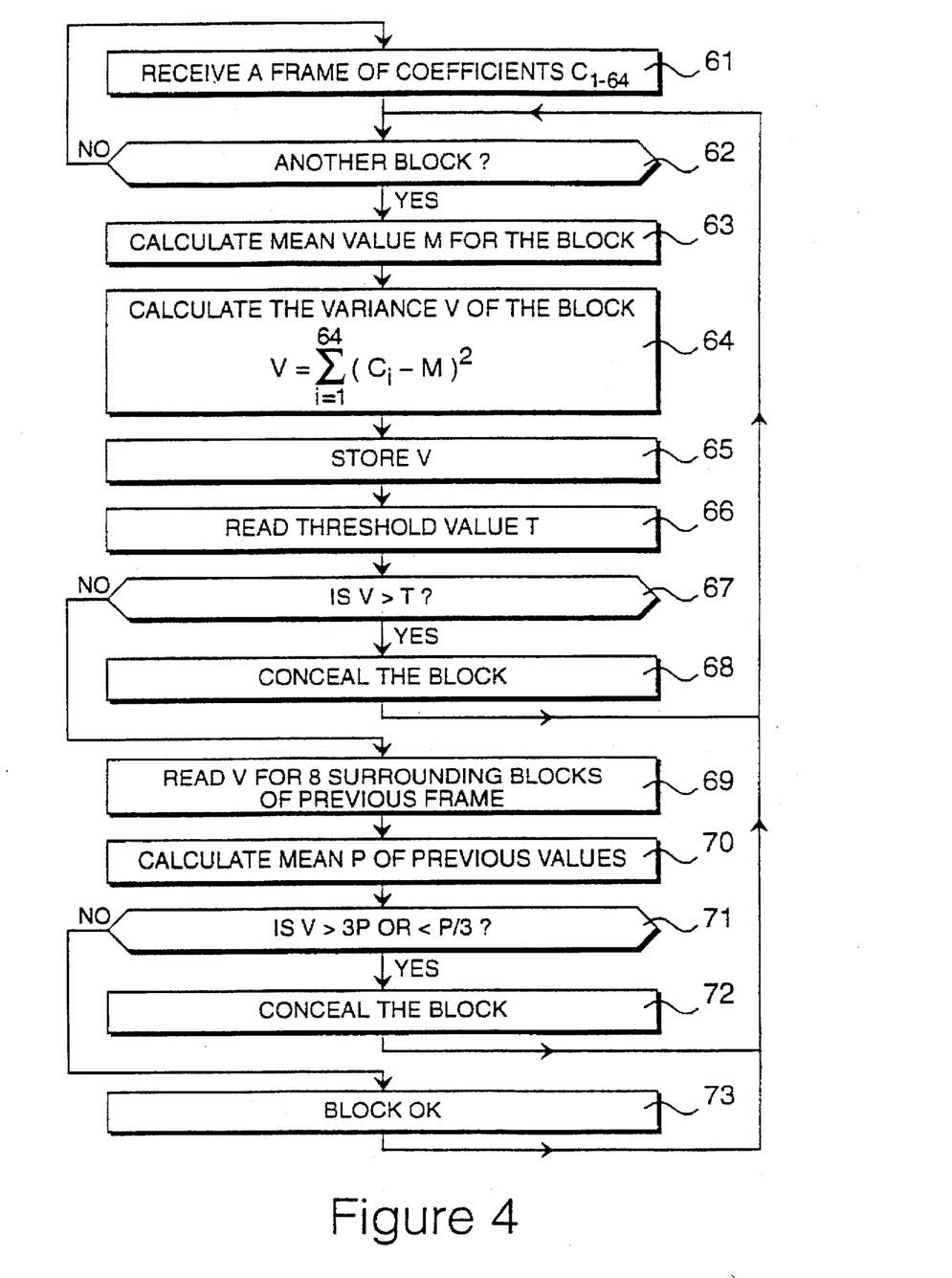
FIG. 4 details the operation of the processing unit shown in FIG. 3, for detecting the presence of an error.

Operational procedures for the processing unit 49 are detailed in FIG. 4. As a result of the transform performed by transform unit 48, a frame of coefficients will become available to processing unit 49, which initiates its processing procedures at step 61. A question is asked at step 62 as to whether another block of the frame is available and, for the first block of a frame, this question will be answered in the affirmative. When answered in the affirmative, the mean value for the coefficients in the block is calculated at step 63. The mean value for the coefficients of an 8×8 block is derived by adding the values of the coefficients together and then dividing by 64.

At step 64 the variance of the values is calculated by subtracting the mean value from each coefficient value to produce a difference value for each particular coefficient. This difference value is squared and the variance is obtained by adding all 64 squared terms.

At step 65 the variance value calculated for the particular block is stored in variance store 55 or 56, depending upon the phase of the particular frame under consideration.

At step 66 a threshold value T is read and at step 67 a question is asked as to whether the variance value calculated at step 64 is larger than the threshold value T. The threshold value T is adjustable or selectable by an operator and may be adjusted to suit a particular type of video transmission. If the variance value calculated at step 64 is larger than the threshold value read at step 66, it is assumed that the block under consideration contains errors, in that a large variance value has been produced due to the presence of errors. Thus, if the question asked at step 67 is answered in the affirmative, the block is concealed by invoking a conceal block routine at step 68.

If the question asked at step 67 is answered in the negative, a further check is performed on the variance value to determine whether said value represents the presence of an error. Previously, said variance value was compared against a threshold value, which is appropriate for identifying very severe errors which produce very large variance values. However, a block having coefficients with a modest variance may still be in error and such an error is detected if the variance is significantly different from the variance values of blocks surrounding the block under consideration, in the equivalent position of a previous frame.

Thus, at step 69, the processing unit accesses the variance store for the previous frame. Therefore, if the variance value calculated at step 64 was written to store 55, step 69 accesses variance values from store 56. The equivalent position to the block under consideration is identified and the variance values for it and the eight surrounding blocks are read from store 56.

At step 70 the mean value P for the previous frame variance values is calculated and a comparison of this previous mean value ms made with the present variance value, at step 71. If the value for the block under consideration is greater than three times the previous mean value P or smaller than the previous mean value P divided by three, it is assumed that the block contains an error and the concealing algorithm as again invoked. Thus, if the value is greater than three times the previous mean or smaller than said previous mean divided by three, the question asked at step 71 is answered in the affirmative and the conceal block routine is called at step 72. Alternatively, if the question asked at step 71 is answered in the negative, the block is considered to be error free at step 73 and control is returned to step 62. Eventually, all of the blocks for a particular frame will have been considered and the question asked at step 62 will be answered in the negative, returning control to step 61 and placing the processing unit 49 in a state ready for the next frame of coefficients.

Figure 5:
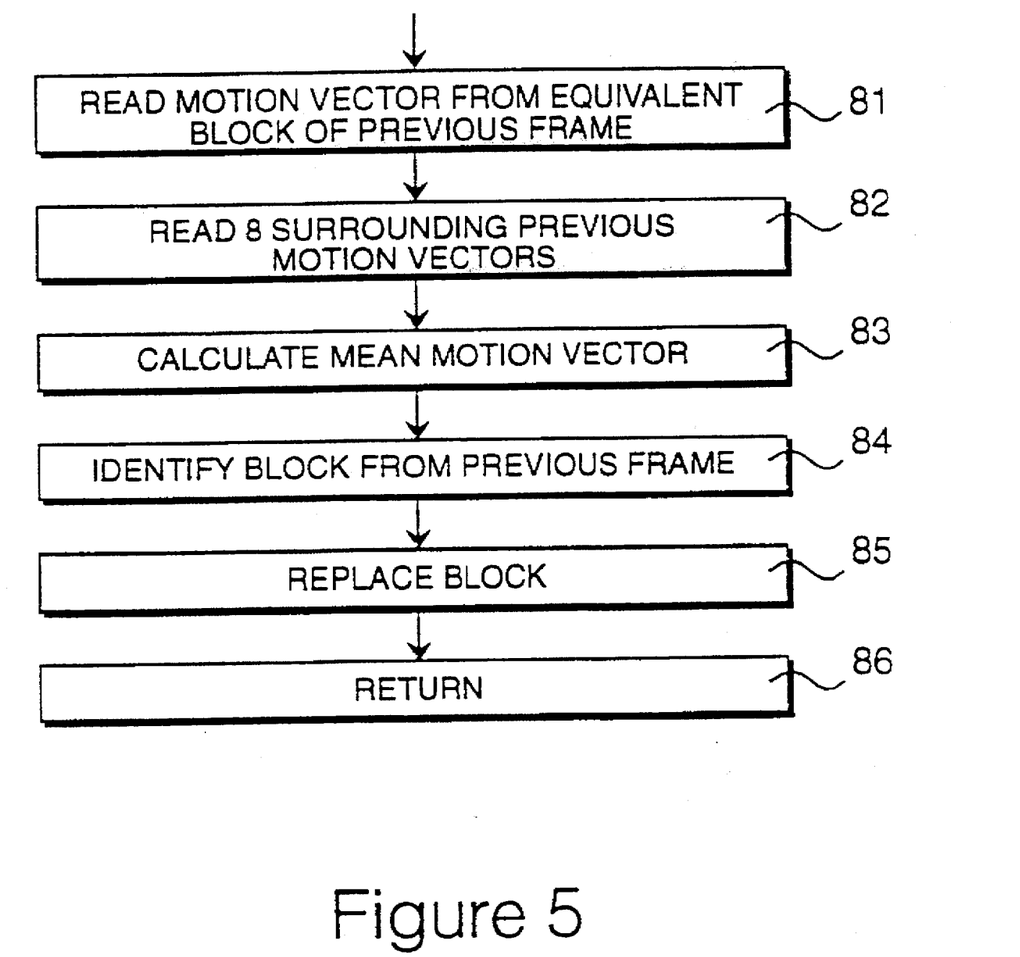
FIG. 5 details the operations of the processing unit shown in FIG. 3, for concealing an error.

The concealing routine which may be called at step 68 or at step 72 is detailed in FIG. 5. For the purposes of this example, it is assumed that image data is being written to image store 43 and that the processing unit 49 has identified a block of image data which contains an error. As data is written to image store 43, previously processed data is read from image store 44, thereby providing a video output signal to output port 42. A period of time is therefore available during which modifications may be made to the image data stored in store 43, before said data is selected by the output controller 46. As image data is written to store 43, motion vectors are written to vector store 52 and, similarly, as the writing of image data is switched to image store 44, the writing of motion vector data is switched to store 53.

Thus, an error is detected by the processing unit in a block of image data which has been written to the image store 43 and the processing unit 49 is now required to effect procedures to conceal she error before this data is supplied to the output port 42.

At step 81 of FIG. 5, the vector store 52 is accessed so as to read the motion vector for the equivalent block of the previous frame.

At step 82 the motion vectors for the eight surrounding blocks are read from vector store 52, thereby providing a total of nine motion vectors to the processing unit 49.

At step 83 an average motion vector is calculated by adding said nine values and dividing by nine to produce an averaged motion vector for accessing image data of the previous frame. Thus, the average motion vector identifies the position of a block in the previous frame which, after being moved in the x and y directions by amounts specified by the motion vector, provides a close match to the block under consideration in the present frame.

Thus, the averaged motion vector identifies a block of data in the previous frame which, at this point in time, will be held in image store 44, the store presently being read to provide an output signal. Thus, at step 85 the data identified in store 44 is read by the block overwrite controller 47, in response to instructions received from the processing unit 49, and written to the block under consideration in the input image store 43.

It is important to note that the block read from the output image store 44 will not necessarily lie within an original block boundary, given that the motion vectors are specified for picture element positions.

After the image block has been overwritten, control is returned to step 62, allowing another block to be considered.

Figure 6:
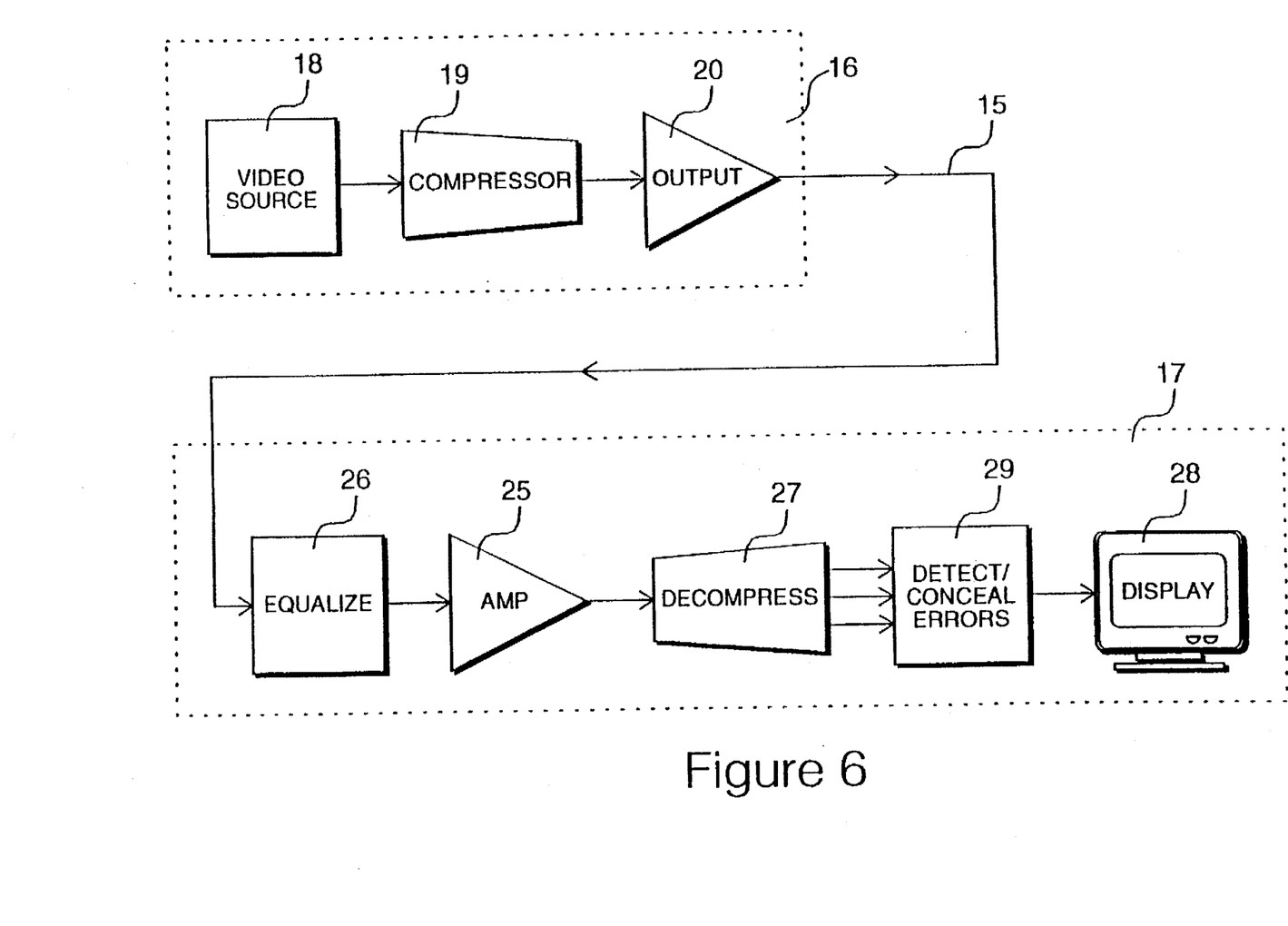
FIG. 6 shows a system including a second embodiment of apparatus for detecting and concealing errors.
Figure 7:
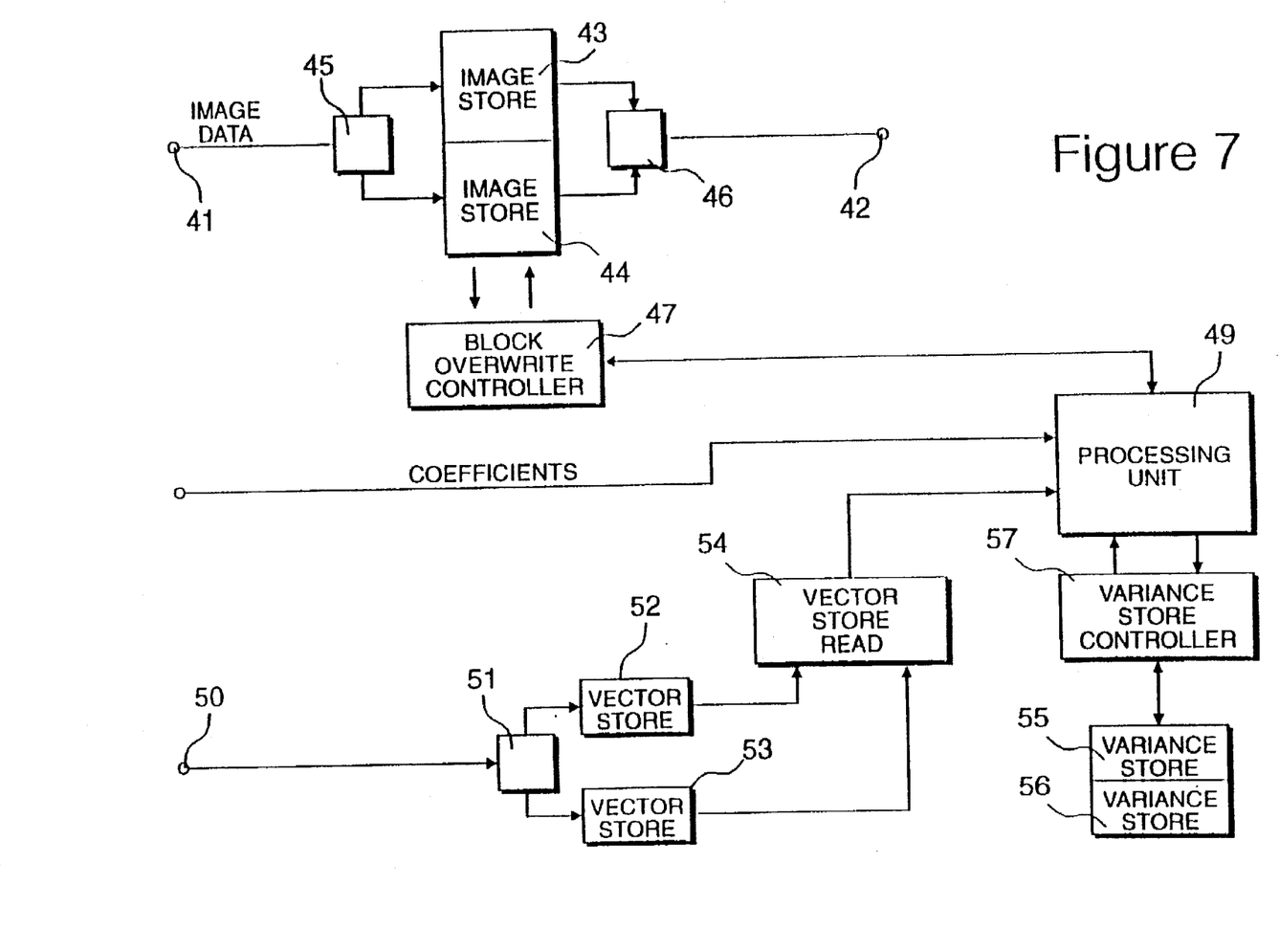
FIG. 7 shows in greater detail the apparatus shown in FIG. 6 for detecting and concealing errors.

FIG. 6 shows a system in which the compressed transmitted signal comprises frequency related coefficients that represent the actual pixel values of the frame. Little or no further processing of the DCT coefficients is therefore required before they are input to the processing unit 49, as shown in FIG. 7. The operation of the circuit as shown in FIG. 7 is otherwise the same as that shown in FIG. 3.

The decompression circuit 27 may include some conventional form of error checking, for instance error correction code checking means. In this case, the decompression circuit flags a macroblock or a Group of blocks (GOB) that is identified as containing an error, (a Group of blocks comprises a matrix of 11 macroblocks by 3 macroblocks). Only those blocks of a flagged macroblock or GOB are passed to the error detecting and concealing circuit 29 to determine which block within the macroblock or GOB contains an error. Those blocks that are not corrupted may therefore be retained, whereas those blocks in which an error is detected can be concealed.

We claim:

1. A method of detecting an error in a signal representing a video image, said method comprising:

receiving blocks of frequency related coefficients representing respective blocks of the image; and analyzing the statistical distribution of said coefficients within a block to detect the presence of corrupted data.

2. A method as in claim 1, wherein said analysing step includes calculating the variance of said coefficients in a block.

3. A method as in claim 2, further comprising:

comparing the calculated variance of a block with a predetermined threshold value, an error being detected if the calculated variance exceeds the predetermined threshold value.

4. A method as in claim 2 further comprising:

comparing the calculated variance of a block of a current frame with the variance value(s) calculated for at least one similarly positioned block(s) in a previous frame, an error being detected if the calculated variance for a block of the current frame differs from the variance of the similarly positioned block(s) of a previous frame by a predetermined amount.

5. A method as in claim 1 further comprising:

firstly dividing the signal into a plurality of portions corresponding to respective blocks of an image; and transforming said portions into blocks of frequency related coefficients.

6. Apparatus for identifying the presence of an error in a signal representing a video image, said apparatus comprising:

means for receiving blocks of frequency related coefficients representing respective blocks of the image; and means for analysing the statistical distribution of said frequency related coefficients representing respective blocks of the image to identify corrupted data.

7. Apparatus as in claim 6, wherein said analysing means includes:

means for calculating the variance of the coefficients in a block.

8. Apparatus as in claim 7, wherein said analysing means includes:

means for comparing said variance value against a predetermined threshold value.

9. Apparatus as in claim 7, wherein said analysing means includes:

means for comparing said variance value against variance value(s) obtained for at least one similarly positioned block(s) in a previous frame.

10. Apparatus as in claim 6, including:

means for storing image data, and means operable in response to detection of an error within a block to substitute for that block a stored block from an earlier frame of the image.

11. Apparatus as in claim 10, including:

means for reading motion vectors included with transmitted video data, and processing means for concealing blocks identified as containing errors by selecting a stored block in response to said motion vectors.

12. Apparatus as in claim 11, wherein:

a new motion vector is calculated by averaging the motion vectors associated with similarly positioned blocks within the previous frame.

13. Apparatus as in claim 6, further comprising:

means for firstly dividing a signal into a plurality of portions corresponding to respective blocks of an image; and means for transforming said portions into blocks of frequency related coefficients.

* * * * *